US009254778B2

(12) United States Patent
Gangakhedkar et al.

(10) Patent No.: US 9,254,778 B2
(45) Date of Patent: Feb. 9, 2016

(54) ADJUSTABLE CAM BUCKLE

(75) Inventors: Dhananjay Gangakhedkar, Twinsburg, OH (US); Matt Romanak, Garfield Hts., OH (US)

(73) Assignee: Cequent Consumer Products, Inc., Solon, OH (US)

( * ) Notice: Subject to any disclaimer, the term of this patent is extended or adjusted under 35 U.S.C. 154(b) by 266 days.

(21) Appl. No.: 12/835,258

(22) Filed: Jul. 13, 2010

(65) Prior Publication Data

US 2011/0005047 A1 Jan. 13, 2011

Related U.S. Application Data

(60) Provisional application No. 61/270,761, filed on Jul. 13, 2009.

(51) Int. Cl.
| | | |
|---|---|---|
| *F16B 45/00* | (2006.01) | |
| *A44B 13/02* | (2006.01) | |
| *B60P 7/08* | (2006.01) | |
| *A44B 11/06* | (2006.01) | |
| *F16G 11/14* | (2006.01) | |
| *F16B 45/02* | (2006.01) | |

(52) U.S. Cl.
CPC .............. *B60P 7/0823* (2013.01); *A44B 11/06* (2013.01); *F16B 45/02* (2013.01); *F16G 11/143* (2013.01); *Y10T 24/3416* (2015.01); *Y10T 24/3443* (2015.01); *Y10T 24/45304* (2015.01); *Y10T 24/45408* (2015.01); *Y10T 24/4755* (2015.01)

(58) Field of Classification Search
CPC ......... F16G 11/10; F16G 11/00; F16G 11/14; F16B 45/00; F16B 15/08; F16B 45/02; A44B 11/12; A44B 11/14; A44B 11/125; B62J 7/08; B60P 7/0823; B60P 7/083; B66C 1/34; B66C 1/125
USPC ........... 24/318, 321, 319, 343, 344, 345, 349, 24/265 H, 68 CD, 69 CT, 71 ST, 71 TD, 191, 24/192, 193, 600.4, 600.5, 600.7, 600.2, 24/600.1, 601.5, 598.7, 134 R; 482/910, 482/49, 92, 96, 40, 129, 121, 134; 16/422; 294/82.23; 55/318, 321, 319, 343, 344, 55/345, 349, 265 H
See application file for complete search history.

(56) References Cited

U.S. PATENT DOCUMENTS

| | | | | |
|---|---|---|---|---|
| 479,026 | A * | 7/1892 | Smeal | .............................. 24/165 |
| 967,664 | A | 8/1910 | Peterson | |
| 1,061,178 | A * | 5/1913 | Huston | ...................... 24/134 R |
| 1,565,392 | A * | 12/1925 | Powers | ........................ 24/265 H |
| 2,270,271 | A * | 1/1942 | Coffing | ......................... 254/223 |
| 2,919,946 | A | 1/1960 | Miener | |
| 2,942,315 | A | 6/1960 | Johnson | |
| 2,998,625 | A | 9/1961 | Huber | |

(Continued)

*Primary Examiner* — Robert J Sandy
*Assistant Examiner* — Rowland Do
(74) *Attorney, Agent, or Firm* — McDonald Hopkins LLC

(57) ABSTRACT

An adjustable cam buckle assembly is described herein. The adjustable cam buckle assembly may include a cam buckle member, a retaining member and a clamp. The cam buckle member may include a hook section and a buckle section, wherein the buckle section may include a central opening and at least one slot. The retaining member may be engaged with the hook section, wherein the retaining member and the hook section may be capable of selectively securing a member within the hook section. The clamp may be pivotally engaged with the buckle section, wherein the clamp may be capable of engaging a strap within the buckle section.

30 Claims, 4 Drawing Sheets

(56) References Cited

U.S. PATENT DOCUMENTS

| | | | |
|---|---|---|---|
| 3,173,539 A * | 3/1965 | Looker | 206/597 |
| 3,253,309 A | 5/1966 | Baresch | |
| 3,413,691 A | 12/1968 | Elsner | |
| 3,678,542 A | 7/1972 | Prete, Jr. | |
| 4,179,148 A | 12/1979 | Johnson | |
| 4,257,644 A * | 3/1981 | Stephens | 296/65.04 |
| 4,507,829 A * | 4/1985 | Looker | 24/68 CD |
| 4,567,628 A * | 2/1986 | Prete et al. | 24/68 CD |
| 4,622,724 A | 11/1986 | Dupre | |
| 4,641,875 A * | 2/1987 | Speich | 294/82.11 |
| 5,623,750 A | 4/1997 | Nasin et al. | |
| 5,669,119 A * | 9/1997 | Seron | 24/265 H |
| 5,682,652 A | 11/1997 | Brody et al. | |
| 5,920,963 A | 7/1999 | Chou | |
| D417,386 S | 12/1999 | Huston | |
| 6,401,309 B1 | 6/2002 | Yang | |
| 7,228,600 B1 | 6/2007 | Selby et al. | |
| D670,154 S * | 11/2012 | Kelleghan | D8/356 |
| 2003/0041420 A1* | 3/2003 | Kosh et al. | 24/193 |
| 2004/0016597 A1* | 1/2004 | Gregory | 182/5 |

* cited by examiner

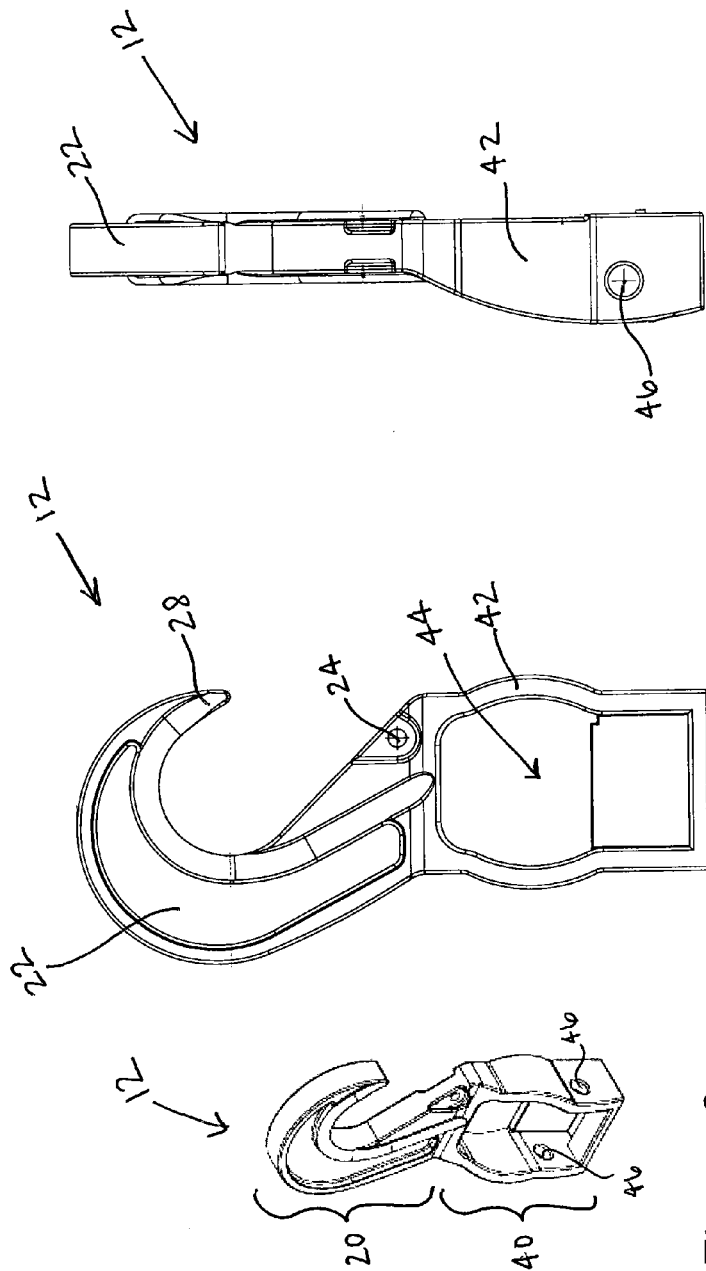
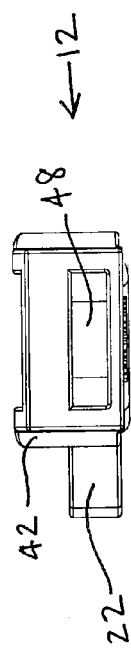
Figure 8
Figure 7
Figure 9
Figure 6

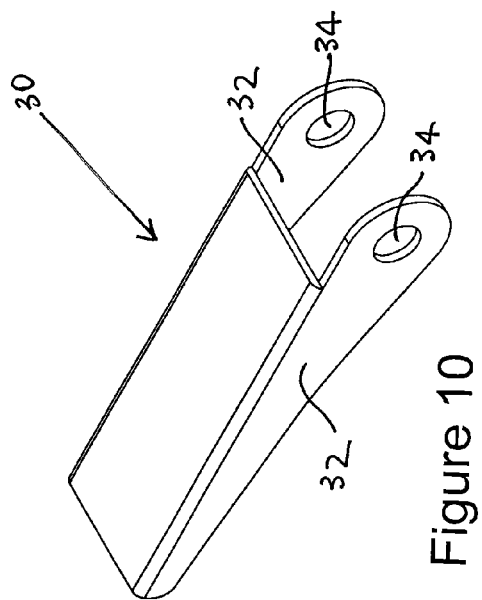
Figure 10
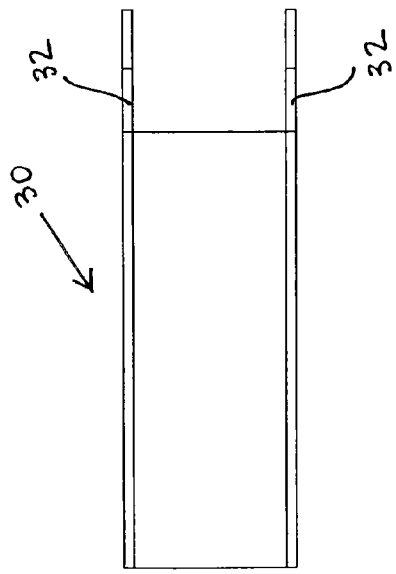
Figure 11
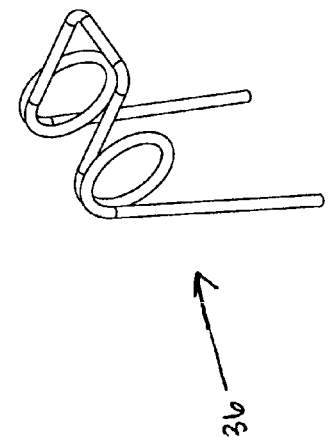
Figure 13
Figure 12

ADJUSTABLE CAM BUCKLE

CROSS-REFERENCE TO RELATED APPLICATION

This application claims benefit from U.S. Provisional Patent Application No. 61/270,761, entitled "Adjustable Cam Buckle," filed on Jul. 13, 2009, which is hereby incorporated by reference in its entirety.

FIELD OF INVENTION

The present invention relates generally to fastening devices and, more particularly, to cargo retraining devices and cam buckles for tightening and tensioning straps.

BACKGROUND

Typically, various types of strap and buckle devices have been utilized for retaining items, such as tarps, in place over cargo or other objects to be protected against the elements. These devices may have generally incorporated a buckle through which a strap may be adjusted as to its length. The strap may be stitched to the tarp at one end or otherwise attached thereto. The buckle in many of these devices may have an attachment means connected to one end. For example, this attachment means may comprise a hook that may fit over the arm of a U-shaped anchoring bracket. These types of devices, however, may have several shortcomings.

For example, the hooks employed by many of these devices may readily become detached from the bracket should the tension on the strap loosen. This of course could result under various types of conditions, such as windy conditions, where movement is applied to the buckle. In addition, conventional cam buckles may employ complex tensioning means to both retain and release the strap for adjustability. These complex means often add cost to the device as well as complicate the process of adjusting the length of the strap.

SUMMARY

An adjustable cam buckle assembly is described herein. The adjustable cam buckle assembly may include a cam buckle member, a retaining member and a clamp. The cam buckle member may include a hook section and a buckle section, wherein the buckle section may include a central opening and at least one slot. The retaining member may be engaged with the hook section, wherein the retaining member and the hook section may be capable of selectively securing a member within the hook section. The clamp may be pivotally engaged with the buckle section, wherein the clamp may be capable of engaging a strap within the buckle section.

DESCRIPTION OF THE DRAWINGS

Objects and advantages together with the operation of the invention may be better understood by reference to the following detailed description taken in connection with the following illustrations, wherein:

FIG. 6 illustrates a perspective view of a cam buckle member of FIG. 2.

FIG. 7 illustrates a front view of the cam buckle member of FIG. 6.

FIG. 8 illustrates a side view of the cam buckle member of FIG. 6.

FIG. 9 illustrates a bottom view of the cam buckle member of FIG. 6.

FIG. 10 illustrates a perspective view of a retaining member of FIG. 2.

FIG. 11 illustrates a front view of the retaining member of FIG. 10.

FIG. 12 illustrates a side view of the retaining member of FIG. 10.

FIG. 13 illustrates a perspective view of a keeper spring of FIG. 2.

DETAILED DESCRIPTION

Reference will now be made in detail to exemplary embodiments of the present invention, examples of which are illustrated in the accompanying drawings. It is to be understood that other embodiments may be utilized and structural and functional changes may be made without departing from the respective scope of the invention. As such, the following description is presented by way of illustration only and should not limit in any way the various alternatives and modifications that may be made to the illustrated embodiments and still be within the spirit and scope of the invention.

An adjustable cam buckle assembly 10 is illustrated in FIGS. 1-5. The adjustable cam buckle assembly 10 may be used to adjustably secure a load or device to the bed of a truck or other similar structure. For example, the adjustable cam buckle assembly 10 may enable an operator to be able to quickly and easily adjust a strap (not shown) when performing both tightening or securing operations and loosening or releasing operations. The adjustable cam buckle assembly 10 may be of any appropriate shape, size, type or configuration.

Figures 1, 2:
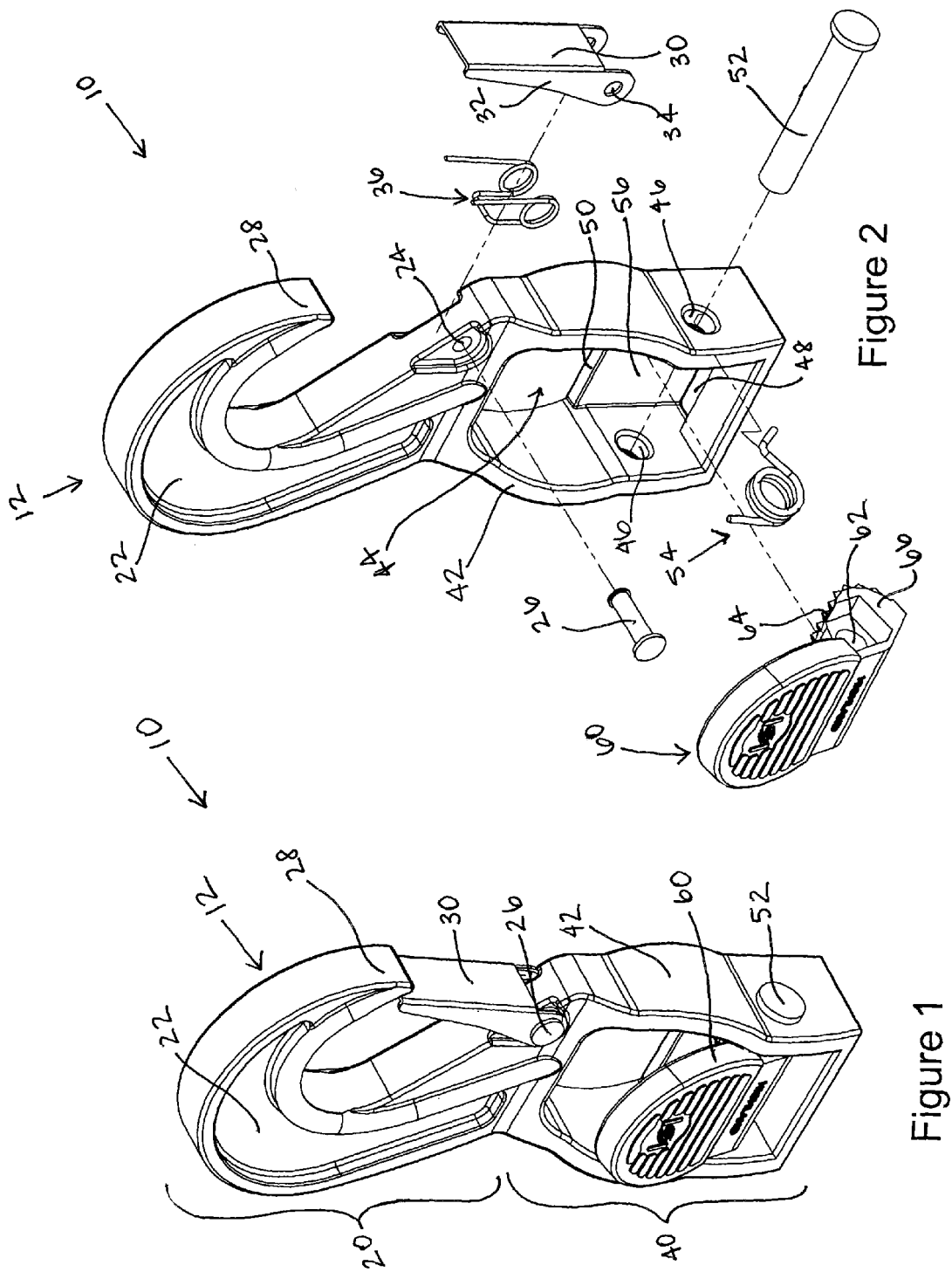
FIG. 1 illustrates a perspective view of an adjustable cam buckle assembly.
FIG. 2 illustrates an exploded perspective view of the adjustable cam buckle assembly of FIG. 1.
Figure 4:
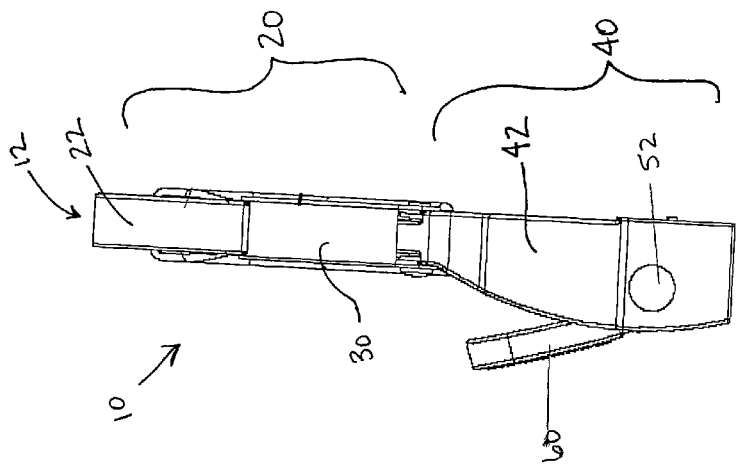
FIG. 4 illustrates a side view of the adjustable cam buckle assembly of FIG. 1.

The adjustable cam buckle assembly 10 may include a cam buckle member 12, a retaining member 30 and a clamp 60 (FIGS. 1-4). The cam buckle member 12 may be of any appropriate shape, size, type or configuration. The cam buckle member 12 may be fabricated out of any appropriate type of materials. For example, the cam buckle member 12 may be fabricated from aluminum. The cam buckle member 12 may include a hook or retaining section 20 and a buckle section 40 (FIGS. 1, 4 and 6).

The hook section 20 and the buckle section 40 of the cam buckle member 12 may be an integrally formed single component or may be separate components that may be secured together by any appropriate means, such as with fasteners, adhesives, by welding or the like (FIGS. 1, 4 and 6). The buckle section 40 may be configured to adjustably retain the strap (not shown) therein. The hook section 20 may be configured to connect to an anchoring device such as a U-shaped bracket (not shown).

The hook section 20 of the cam buckle member 12 may include a hook 22 and at least one aperture 24 (FIGS. 2 and 7). The hook aperture 24 may be of any appropriate shape or size, such as a generally cylindrical shape. The hook aperture 24 may be located at any appropriate position on the hook section 20, such as at an end of the hook section adjacent the buckle section 40 (FIGS. 2 and 7).

The hook 22 may be of any appropriate shape, size, type or configuration, such as of a generally curved C-shape (FIGS.

1-3 and 7). For example, the hook 22 may be generally curved to define an opening and/or to grab and hold a connecting object. The hook 22 may be located at any appropriate position on the hook section 20, such as adjacent to the buckle section 40 (FIGS. 1, 4 and 6). An anchoring device or other fixed object may be held or retained by the curved portion of the hook 22. The hook 22 may include a tip 28 (FIGS. 1-3 and 7). The hook tip 28 may be located at an end of the hook 22 and at a position opposite that of the hook aperture 24.

The retaining member 30 may be of any appropriate shape, size, type or configuration. For example, the retaining member 30 may be of a generally rectangular or square shape (FIGS. 1-4 and 11-12). The retaining member 30 may be located at any appropriate position on the cam buckle member 12, such as adjacent the hook section 20 and above the buckle section 40 (FIGS. 1-4).

The retaining member 30 may include at least one sidewall 32 (FIGS. 10-12). For example, the retaining member 30 may include a pair of sidewalls 32. The sidewalls 32 may be of any appropriate shape, size, type or configuration. For example, the sidewalls 32 may be of a generally rectangular or triangular shape. The sidewalls 32 may be located at any appropriate position on the retaining member 30, such as on each side of the retaining member 30 (FIGS. 10-12).

The sidewalls 32 may include at least one aperture 34. For example, each sidewall 32 may include an aperture 34 (FIGS. 10-12). The apertures 34 may be of any appropriate shape, size, type or configuration. For example, the apertures 34 may be of a generally circular shape. The apertures 34 may be located at any appropriate position on the sidewalls 32, such as adjacent to an end of each sidewall 32 and opposite to each other (FIGS. 10-12).

Figure 3:
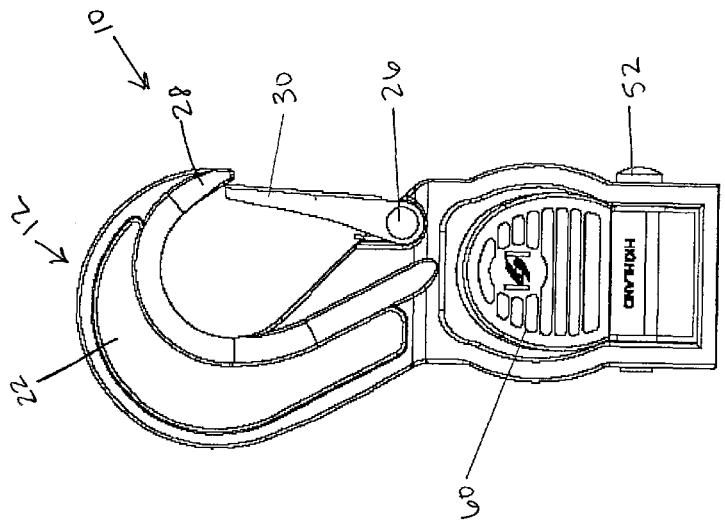
FIG. 3 illustrates a front view of the adjustable cam buckle assembly of FIG. 1.
Figure 5:
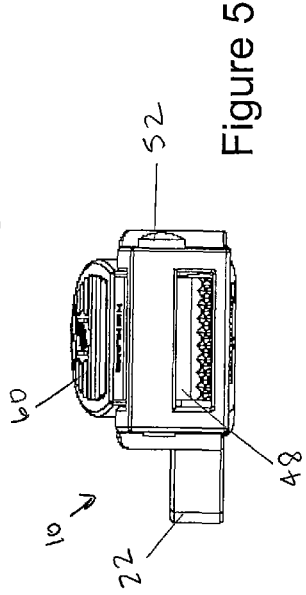
FIG. 5 illustrates a bottom view of the adjustable cam buckle assembly of FIG. 1.

The retaining member 30 may be movably or pivotally connected to the hook 22 and capable of selectively closing the opening within the C-shape of the hook 22 (FIGS. 1 and 3). For example, the end of the retaining member 30 with the apertures 34 may be rotatably or pivotally connected to the hook section 20 by way of a retaining pin or rivet 26 located through the hook apertures 34. The opposite end of the retaining member 30 may be movable between opened and closed positions with the hook tip 28 (FIGS. 1 and 3).

The retaining pin or rivet 26 may be of any appropriate shape, size, type or configuration. For example, the retaining rivet 26 may be of a generally cylindrical shape (FIGS. 1-3). The retaining rivet 26 may be located at any appropriate position on the cam buckle member 12, such as adjacent to hook section 20 and through the hook apertures 24 (FIGS. 1-3).

The adjustable cam buckle assembly 10 may include a keeper spring 36 (FIGS. 2 and 13). The keeper spring 36 may be of any appropriate shape, size, type or configuration. The keeper spring 36 may be located at any appropriate position on the adjustable cam buckle assembly 10, such as adjacent to the hook apertures 24. For example, the keeper spring 36 may be located within the retaining member 30 and aligned with the retaining member apertures 34 (FIG. 2).

The keeper spring 36 may be arranged to bias the retaining member 30 into the closed position. The force of the keeper spring 36 may be overcome to depress the retaining member 30 from the closed position to the open position. In the closed position, the retaining member 30 may abut an inner portion of the hook 22, thereby closing the opening and preventing the hook 22 from detaching from a bracket or other connecting object. In the opened position, the second end of the retaining member 30 may be depressed away from the hook 22 to allow a connecting object to be inserted into or removed from the hook 22 by way of the retaining member 30 being opened from the hook 22.

The buckle section 40 of the cam buckle member 12 may include a body 42 having a central opening 44 (FIGS. 2 and 7). The body 42 may by of any appropriate shape or size. For example, the body 42 may be of a generally square or rectangular shape. The body 42 may be located at any appropriate position on the cam buckle member 12, such as adjacent to the hook section 20.

The central opening 44 may be of any appropriate shape or size. For example, the central opening 44 may be of a generally square or rectangular shape (FIGS. 2 and 7). The central opening 44 may be located at any appropriate position on the body 42, such as within a general central portion of the body 42.

The body 42 may include at least one aperture 46. For example, the body 42 may include a pair of apertures 46 (FIGS. 2 and 6). The apertures 46 may be of any appropriate shape or size. For example, the apertures 46 may be of a generally square or cylindrical shape. The apertures 46 may be located at any appropriate position on the body 42, such as adjacent to an end of the body 42 opposite that of the hook 22 (FIGS. 2 and 8). For example, the apertures 46 may be located on opposite sides of the body 42, whereby the apertures 46 are located opposite each other.

The buckle section 40 of the cam buckle member 12 may be generally configured to receive a first end of a strap and tighten the strap about cargo. A second end of the strap may be secured to an object or may be connected to a second connecting device, such as a second adjustable cam buckle assembly 10.

The body 42 may include at least one slot and a partition or divider 56. For example, the body 42 may include a first slot 48 and a second slot 50 (FIG. 2). The first slot 48 may be of any appropriate shape or size. For example, the first slot 48 may be of a generally square or rectangular shape. The first slot 48 may be located at any appropriate position on the body 42, such as at or adjacent to an end of the body 42 and opposite that of the hook 22 (FIGS. 2 and 9).

The second slot 50 may be of any appropriate shape, size, type or configuration. For example, the second slot 50 may be of a generally square or rectangular shape. The second slot 50 may be located at any appropriate position on the body 42, such as at a generally central location on the body 42 (FIG. 2).

The partition or divider 56 may be of any appropriate shape, size, type or configuration. For example, the partition 56 may be of a generally square, rectangular or cylindrical shape. The partition 56 may be located at any appropriate position on the body 42, such as adjacent to and located between the first slot 48 and second slot 50 (FIG. 2).

In use, the first slot 48 may receive the strap therein and a second slot 50 through which the strap may exit the buckle section 40. Thus, the adjustable cam buckle assembly 10 may be selectively moved along the length of the strap to the desired location to provide a length of strap capable of tightly securing cargo. The clamp 60 may secure the strap at the desired location and prevent the adjustable cam buckle assembly 10 from moving with respect thereto.

The clamp 60 may be pivotally connected to the buckle section 40 by any appropriate means. For example, the clamp 60 may be connected to buckle section 40 by a buckle pin or rivet 52 (FIGS. 1-5). The buckle rivet 52 may be of any appropriate shape, size, type or configuration. For example, the buckle rivet 52 may be of a generally cylindrical shape. The buckle rivet 52 may be located at any appropriate position on the cam buckle member 12, such as adjacent to an end of the body 42 through the body apertures 46 (FIGS. 1-5).

The clamp 60 may include a gripping section 66 and at least one aperture 62 (FIG. 2). The gripping section 66 may be of any appropriate shape or size, such as a generally semi-circular shape. The gripping section 66 may be located at any appropriate position on the clamp 60, such as adjacent an end of the clamp 60 (FIG. 2). The aperture 62 may be of any appropriate shape or size, such as a generally cylindrical shape. The aperture 62 may be located at any appropriate position on the clamp 60, such as adjacent the gripping section 66 (FIG. 2).

The buckle rivet 52 may also be inserted through the clamp aperture 62 (FIGS. 1, 2 and 4). The clamp 60 may pivot about the buckle rivet 52 between an opened position and a closed position. In the closed position, the gripping section 66 of the clamp 60 may pinch the strap against the buckle section 40 to prevent the strap from sliding with respect thereto. For example, the gripping section 66 of the clamp 60 may include a plurality of teeth 64.

The teeth 64 may be of any appropriate shape, size, type or configuration. For example, the teeth 64 may be of a generally triangular shape. The teeth 64 may be located at any appropriate position on the clamp 60, such as on the gripping section 66 (FIG. 2). The teeth 64 may engage the strap and hold the strap in place. The clamp 60 may be pivoted from the closed position to the open position wherein the gripping section 66 and teeth 64 disengage from the strap to allow the strap to move freely.

The clamp 60 may be biased towards the closed position to prevent the strap from sliding under normal conditions. For example, the clamp 60 may be engaged with a spring 54 (FIG. 2). The spring 54 may be of any appropriate shape, size, type or configuration, such as a tension spring 54. The tension spring 54 may be located at any appropriate position on the cam buckle member 12, such as adjacent to the clamp 60 and an end of the body 42 (FIG. 2).

The tension spring 54 may bias the clamp 60 into the closed position. For example, the tension spring 54 may be wound around the buckle rivet 52 and apply a force to the side opposite the clamp 60 away from the buckle section 40, thereby pivoting the clamp 60 into engagement with the strap.

The clamp 60 may be pivoted into an open position by applying a force sufficient to overcome the force of the tension spring 54 to the side of the clamp 60 opposite the gripping section 66 (FIGS. 1 and 2). The applied force may pivot the clamp 60 into the open position, thereby releasing the strap and allowing the strap to be adjusted.

Although the embodiments of the present invention have been illustrated in the accompanying drawings and described in the foregoing detailed description, it is to be understood that the present invention is not to be limited to the embodiments disclosed, but that the invention described herein is capable of numerous rearrangements, modifications and substitutions without departing from the scope of the claims hereafter.

Having thus described the invention, the following is claimed:

1. An adjustable cam buckle assembly comprising:
   a cam buckle member including a hook section and a buckle section, wherein said buckle section includes first and second slots and said hook section includes a base and a hook extending away from said base;
   a strap received within said buckle section, wherein said first and second slots receive said strap;
   a retaining member biasedly engaged with said hook section and pivotally attached with said base of said hook section; and
   a clamp biasedly engaged with and pivotally attached to said buckle section, wherein biasing of said retaining member is independent of biasing of said clamp.

2. The cam buckle assembly of claim 1, wherein said retaining member is biased against said hook section via a keeper spring.

3. The cam buckle assembly of claim 2, wherein said retaining member is capable of selectively securing an item within said hook section.

4. The cam buckle assembly of claim 2, wherein said keeper spring biases said retaining member in a closed position contacting said hook section.

5. The cam buckle of claim 4, wherein said retaining member is capable of selectively unsecuring an item from within said hook section free of movement of said clamp.

6. The cam buckle of claim 2, wherein said keeper spring is a torsion spring.

7. The cam buckle assembly of claim 1, wherein said clamp includes a gripping portion.

8. The cam buckle assembly of claim 7, wherein said gripping portion includes a plurality of teeth engaging said strap.

9. The cam buckle of claim 7, wherein said buckle section includes a body and said gripping portion is positioned within said body.

10. The cam buckle assembly of claim 1, wherein said clamp is in biased engagement with the strap via a tension spring.

11. The cam buckle assembly of claim 10, wherein said clamp is pivotally engaged with said buckle section via a rivet.

12. The cam buckle of claim 10, wherein said tension spring is a torsion spring.

13. The cam buckle assembly of claim 1, wherein said buckle section includes a central opening.

14. The cam buckle assembly of claim 1, wherein said retaining member is pivotally attached with said hook section at a fixed pivot.

15. An adjustable cam buckle assembly comprising:
    a cam buckle member including a hook section and a buckle section, wherein said buckle section includes a central opening and at least one slot;
    a strap received in said buckle section;
    a retaining member pivotally engaged with said hook section, wherein said retaining member and said hook section are capable of selectively securing a member within said hook section;
    a biasing member engaged with said retaining member pivotally biasing said retaining member into contact with said hook section; and
    a clamp pivotally engaged with said buckle section, wherein said clamp is capable of engaging a strap within said buckle section, wherein a first portion of said strap extends out from said buckle section, said first portion having a length whereby said clamp member permits adjustment of said length of said first portion.

16. The cam buckle assembly of claim 15, wherein said clamp includes a gripping portion.

17. The cam buckle assembly of claim 16, wherein said gripping portion includes a plurality of teeth engaging said strap.

18. The cam buckle assembly of claim 15, wherein said clamp is biased towards a closed position via a tension spring to secure the strap.

19. The cam buckle assembly of claim 15, wherein said retaining member is pivotable with respect to said hook section independent of said pivoting of said clamp.

20. The cam buckle assembly of claim 15, wherein pivoting of said clamp member permits adjustment of said length of said first portion.

21. An adjustable cam buckle assembly comprising:
  a cam buckle member including a hook section and a buckle section;
  a retaining member selectively engaged with said hook section and pivotally attached to said cam buckle member at a first pivot, wherein said retaining member is selectively moveable with respect to said hook section;
  a biasing member engaged with said retaining member biasing said retaining member into contact with said hook section; and
  a clamp moveably secured to said buckle section at a second pivot, wherein said retaining member is selectively moveable independent of movement of said clamp; and
  wherein said first pivot is generally perpendicular relative to said second pivot.

22. The cam buckle assembly of claim 21, wherein said clamp is capable of selectively engaging a strap within said buckle section.

23. The cam buckle assembly of claim 22, further comprising a clamp biasing member operatively engaged with said clamp, wherein said clamp biasing member biases said clamp towards a closed position capable of securing said strap within said buckle section.

24. The cam buckle of claim 23, wherein biasing of said retaining member is independent of said biasing of said clamp.

25. The cam buckle assembly of claim 21 further comprising a strap inserted into said buckle section wherein a first portion extends out from said buckle section, said first portion having a length whereby said clamp permits adjustment of said length of said first portion.

26. The cam buckle assembly of claim 25, wherein pivoting of said clamp permits adjustment of said length of said first portion.

27. An adjustable cam buckle assembly comprising:
  a cam buckle member including a hook section and a buckle section;
  a retaining member pivotally attached to said cam buckle at a first fixed pivot and selectively moveable between engaged and unengaged positions relative said hook section; and
  a clamp pivotally secured to said buckle section at a second pivot, wherein said retaining member is selectively pivotally independent of pivoting of said clamp; and
  wherein said first pivot is proximate said hook section and said second pivot is distal said hook section.

28. The cam buckle of claim 27 further comprising a biasing member engaged with said retaining member pivotally biasing said retaining member into the engaged position related to said hook section.

29. The cam buckle of claim 27, further comprising a strap operatively engaged with said buckle section, wherein the clamp pivots to change operative length of said strap.

30. An adjustable cam buckle assembly comprising:
  a cam buckle member including a hook section and a buckle section, wherein said buckle section includes at least one slot and said hook section includes a base and a hook extending away from said base;
  a strap received within said buckle section;
  a retaining member biasedly engaged with said hook section and pivotally attached with said base of said hook section; and
  a clamp biasedly engaged with and pivotally attached to said buckle section, said clamp including a gripping portion, said gripping portion includes a plurality of teeth engaging said strap, wherein biasing of said retaining member is independent of biasing of said clamp.

* * * * *